Figure 1:
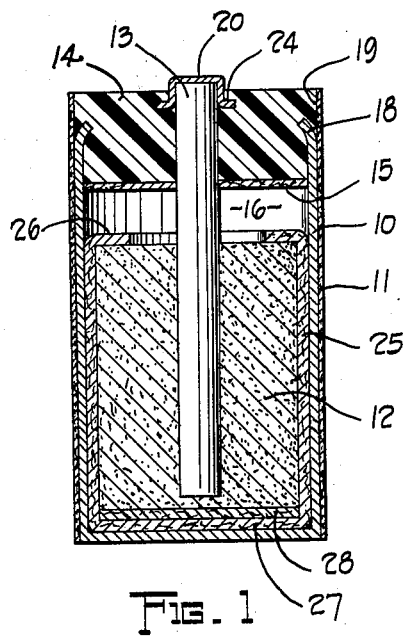

Feb. 2, 1960 E. M. KLOPP 2,923,757
DRY CELL
Filed March 27, 1957

INVENTOR.
EDWARD M. KLOPP
BY Bosworth, Sessions,
Herretron & Knowles

United States Patent Office 2,923,757
Patented Feb. 2, 1960

2,923,757

DRY CELL

Edward M. Klopp, Medina, Ohio, assignor to P. R. Mallory & Co. Inc., Indianapolis, Ind., a corporation of Delaware Application March 27, 1957, Serial No. 648,840

6 Claims. (Cl. 136—107)

This invention relates to primary electric cells and more particularly to separators for dry cells of the Leclanché type.

The conventional Leclanché cell consists of a metal anode preferably in the form of a zinc can, a carbon electrode surrounded by a body of depolarizing material ordinarily known as the mix and conventionally comprising a mixture of manganese dioxide and finely divided carbon, and a bibulous separator between the depolarizer and the anode. The electrolyte, which may be a conventional solution containing ammonium chloride and zinc chloride, permeates the mix and the separator and comes in contact with the zinc anode. The function of the separator is to prevent direct contact and, hence, short-circuiting between the depolarizer and the anode while at the same time permitting the required flow of ions. In other words, the separator must prevent electronic flow of current while permitting ionic flow. The separator is ordinarily composed of a bibulous organic material such as gelatinized starch, or porous paper coated with a flour paste or starch.

The present invention relates particularly to cells of the so-called paper-lined type, i.e., those in which the separator is composed of a strip or sheet of a base material such as paper or other permeable, flexible sheet material coated with a gelatinous material such as flour paste or starch. It is customary in the manufacture of cells of this type to impregnate the base material with a solution or suspension of the gelatinous material; then to let the paper dry and insert it in the anode cans in the dry state. The paper or other base material is ordinarily supplied in strip form and is cut to size, formed into shape and inserted into the zinc anode cans by automatic machinery. Sufficient electrolyte is supplied during the manufacture of the cell to wet the dried material and convert it again to a gel. This method, while widely used, is disadvantageous in that the amount of gelatinous material that can be carried by the paper is limited; there are serious difficulties in handling the paper in wet form while it is being impregnated with the gelatinous material; and there are certain highly desirable gel-forming materials that cannot be made into gels, then dried and then caused to gel again by the presence of an electrolyte. In particular, certain useful inorganic gelling materials, such as finely divided silicates, are converted into irreversible solids once they have been made into gels and then dried.

A general object of the present invention, therefore, is to provide improved separators for Leclanché cells and particularly to provide separators in which the above-noted difficulties are obviated or substantially reduced. Other objects include the provision of improved dry cells embodying such separators, the provision of a method of making separators which does not require the handling of the separators in the wet state and the provision of separators and of methods of making separators and dry cells which permit the utilization of a wide variety of gelling materials. A further object is the provision of dry cells and separators for dry cells having the above advantageous characteristics and which can be manufactured at reasonable cost.

Briefly, the present invention contemplates a separator for dry cells comprising a strip or sheet of flexible, fibrous base material such as paper, cloth felted fibrous material or the like having thereon a thin coating of a sticky material which provides a sticky surface on the fibers making up the base material but which does not destroy the porosity or permeability of the fibrous base material. The strip with the sticky coating thereon is then coated with the gelling material in the form of a dry, finely divided powder. The gelling material adheres to the strip and coats the sticky surfaces so that the strip with the gelling material thereon can be handled readily by automatic machinery. The strip is then assembled in an otherwise conventional cell with the gel-forming powder disposed adjacent the surface of the anode. Sufficient electrolyte is supplied to the cell to convert the powdered gel-forming material into a gel, thereby completing the cell.

A preferred form of the invention as applied to a conventional Leclanché type cell is illustrated in the drawings, in which Figure 1 is a vertical sectional view of a flashlight cell embodying the invention, showing the various layers in the wall enlarged for clarity and not necessarily in correct scale relative to each other.

Figure 2:
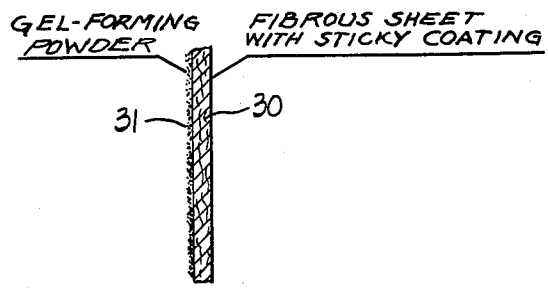
Figure 3:
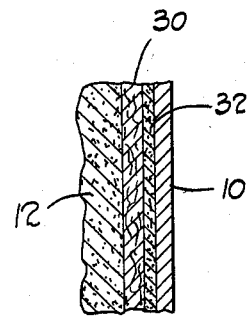

Figure 2 is a diagrammatic illustration on a greatly enlarged scale showing the separator of the invention in the dry state, and Figure 3 is a similar enlarged diagrammatic illustration showing the separator saturated with electrolyte and in contact with the anode and the depolarizing mix.

As shown in Figure 1, the present invention may be adapted to cells that are otherwise of conventional construction without requiring any substantial change except in the separator. The cell of Figure 1 comprises an anode container or can 10, composed of zinc or other appropriate metal, which is encased in the usual cardboard sheath 11. The customary mass or cake of depolarizing mix 12 is within the anode cup, and a carbon electrode 13 is embedded in the mix cake and projects upwardly above the top of the zinc cup 10. The cell is sealed by means of an ordinary wax seal 14 poured in while hot and supported by a paper washer 15 which is impaled upon the carbon electrode, there being an air space 16 between the top of the mix cake and the washer 15. Preferably the upper edge 18 of the can 10 is turned inwardly as shown, and the sealing material contacts and adheres to the upper portion 19 of the cardboard sheath 11. The carbon rod is provided with a terminal cap 20 having a flange 24 that is embedded in the sealing composition. Obviously, other seal constructions may be used if desired. All of these details of the construction of the cell are conventional and form no part of the present invention.

The present invention relates primarily to the paper separator 25 which is interposed between the mix cake 12 and the inner surface of the zinc can 10. The separator not only extends between the cylindrical surfaces of the mix cake and the zinc container, but also is preferably folded inwardly at the top of the mix cake as indicated at 26 and extends across the bottom of the container as indicated at 27. A strong bottom washer 28 composed of paraffin impregnated pasteboard or the like overlies the bottom 27 of the separator in order to protect the separator from possible damage by the carbon electrode during the operation of assembling the cell.

According to a preferred form of the present invention, the separator 25 is formed from a strip or sheet of conventional separator paper 30, see Figures 2 and 3, which has been coated with a thin layer of polybutene. The polybutene may be applied conveniently by spraying it onto the paper strip in the form of a 28 percent solution by weight of polybutene in benzene. The benzene evaporates quickly, leaving a sticky surface of polybutene. The polybutene coating on the strip is of such thinness that it produces no readily measurable increase in the thickness of the paper strip; and while it appears to coat the individual fibers of the paper and gives the surface of the paper a general overall stickiness, it does not substantially impair the porosity of the paper itself.

The amount of polybutene required is small. Satisfactory results are obtained within the range of from about 0.004 gram to about 0.014 gram of polybutene per square inch of paper surface, with a thickness of about 0.009 gram per square inch being preferred. The amount of polybutene employed is small, so that the cost of the polybutene is nominal in comparison with the cost of the remaining components of the cell. The characteristics of the polybutene do not seem to be critical. Preferably, polybutene of fairly high molecular weight is used because the higher viscosity of the high molecular weight polybutenes makes them more adherent at elevated temperatures. However, polybutenes of lower molecular weight and viscosity can also be employed. Polybutene 128 manufactured by the Oronite Chemical Company is satisfactory as a polybutene of high molecular weight. Polybutene 24 manufactured by the same company is a polybutene of lower molecular weight which has also been used with good results.

Other materials which will provide a sticky surface on the paper without filming over to such an extent as to materially impair the permeability of paper to ions may be employed. The materials should have the quality of remaining sticky for considerable periods of time, i.e., for periods long enough to permit the gel-forming powder to be applied and the coated base material incorporated in the cell before the coating loses its stickiness. In some manufacturing operations this may be only a few hours or a day or two; in others, several weeks or months may elapse between the time the paper is coated and the completion of the cells. The coating material also must not contaminate the electrolyte.

While it is preferred to employ paper of the kind ordinarily employed in paper-lined dry cells, other porous fibrous materials can be employed as the base for the separators if desired. For example, woven textile materials may be employed, felted or woven glass fiber materials can be used, and felted materials composed of synthetic fibers may also be employed. Preferably, the polybutene or other sticky material is applied to only one side of the strip material, but it penetrates the strip to a certain extent. The polybutene may be applied to both sides if desired so long as the deposit of polybutene remains discontinuous so that the permeability and porosity of the strip is not destroyed.

After the strip material has been coated with polybutene or other sticky substance and the sticky coating has dried, that is, after the solvent has evaporated, the gel-forming material 31 is applied to the sticky coating in the form of a dry powder. This may be accomplished merely by running the strip having the sticky coating thereon through a bin containing the gel-forming material in finely-divided powder form, by shaking the gel-forming powder onto the strip, by blowing it onto the strip, or in any other convenient manner. It is not necessary to exercise any great degree of care in applying the powder to the strip because the amount of powder that adheres to the strip is more or less automatically controlled by the adhesiveness of the sticky material on the strip and the size and character of the powder itself. It appears probable that the layer of the particles of the powder adhering to the strip has a thickness of only one particle, or at most only a few particles. The particles that do not engage the sticky material are in large measure shaken off during the handling of the strip. It is to be noted, however, that since the sticky surfaces are all coated with powder, the strip is easy to handle after the powder has been applied to it and can then be cut and assembled with the remaining components of the cell by automatic machinery in the usual manner.

The invention is adapted to the use of almost any gelling agent that is otherwise suitable for dry cell use and which will form a gel from the dry state when placed in contact with the conventional electrolyte. For example, ordinary cereal flour such as is employed in conventional cells may be used advantageously with the sticky strip as a backing. However, the invention has an important advantage in that it permits the use of gelling materials which could not otherwise be employed in conventional paper-lined cells. Such materials include those which when made into a gel and then dried cannot be caused to form a gel again simply by adding moisture or electrolyte thereto. Very finely divided silica ($SiO_2$) is one such material that gives advantageous results. Silica powder, having an average particle size of about 0.030 micron with a specific gravity of about 1.95 and a surface area of approximately 110 square meters per gram, and consisting principally of $SiO_2$ with only traces or very small percentages of other oxides, is preferred. A satisfactory colloidal silica is sold by the B. F. Goodrich Chemical Company under the name of "Microsil." This material is applied in powder form to the paper strip coated with polybutene; from about 0.0006 gram to about 0.004 gram of Microsil per square inch of paper surface adhered to the strip material; a preferred amount is 0.002 gram per square inch. When the material is incorporated in a conventional cell, the Microsil powder gels under the influence of the electrolyte and provides a gel layer 32 adjacent the zinc as indicated in Figure 3.

Tests have shown that cells embodying such separators made according to the present invention are superior to cells embodying conventional separators. For example, cells embodying a given gelling material give about the same service life as cells embodying the same gelling material and base material but made according to conventional methods. Manufacturing costs are reduced because the necessity for handling strips of backing material when they are wet with gelling material and then drying the strips is eliminated. Great advantages are derived from the use of separators embodying colloidal silica. These separators are able to withstand the effects of exposure to elevated temperatures much better than separators made with conventional organic gels such as flour paste. Another advantage of the separator embodying the colloidal silica gel is found in the fact that under conditions of heavy discharge, cells made with colloidal silica gel separators produce only about 20 percent as much spew as cells made with ordinary flour paste paper separators under identical test conditions. The reduction in the amount of spew minimizes the leakage problem that is always present in cells of the Leclanché type. As noted above, the silica powder gel cannot be incorporated in cells by conventional methods and procedures. The sticky paper base material makes possible the use of these materials in cells.

Other powder materials that form gels in contact with the electrolyte and that are suitable for applicant's purposes include methyl cellulose powder, ethyl-cellulose powder, polyvinyl alcohol in powder form and powders composed of polyacrylamides such as the medium molecular weight polyacrylamide marketed by American Cyanamid Company under the name PAM 75. Other synthetic gel-forming materials may also be employed such as the material marketed by B. F. Goodrich Chemical Company under the name Carbopol 934 which is a polymeric material containing a high percentage of carboxylic acid groups. These materials all give increased service life over conventional flour paste paper separators, which increase is particularly noticeable when the cells have been subject to high temperatures. The materials also produce much less spew under rapid discharge conditions than conventional separators.

From the foregoing description of preferred forms of the invention, it will be evident that I have provided improved dry cells of the Leclanché type which can be manufactured economically, in which improved service life after exposure to high temperatures is obtained and in which there is a substantial reduction in the formation of spew. The improvement in my cells is due largely to the improved form of separator disclosed herein, and the separator can be manufactured economically and efficiently by the method disclosed herein. My method of manufacturing separators gives great flexibility in the selection of gelling materials and makes it possible to employ gelling materials that are suited for a particular service without requiring changes in the manufacturing techniques of the cells themselves so long as the equipment is provided for coating the base material with the sticky material and then with the gelling material in powdered form.

Those skilled in the art will appreciate that various changes and modifications can be made in the invention without departing from the spirit and scope thereof. The essential characteristics of the invention are set forth in the appended claims.

I claim:

1. A primary cell comprising a zinc anode container, a carbon electrode disposed within the zinc anode and surrounded by a depolarizing mix, and a permeable separator interposed between the mix and the interior surface of the zinc anode, said separator comprising a sheet of porous flexible fibrous material having a sticky coating consisting essentially of polybutene thereon and a layer consisting essentially of a gelling material adhering to said sticky coating and disposed in contact with the inner surface of the zinc anode container.

2. A primary cell according to claim 1 wherein the permeable separator is composed of a strip of porous paper.

3. A primary cell according to claim 1 wherein the gel-forming material consists essentially of finely divided silica.

4. A separator for primary cells comprising a permeable sheet of fibrous material having a sticky coating of polybutene on at least one side thereof and a layer of a gel-forming powder adhering to the sticky coating.

5. A separator according to claim 4 wherein the gel-forming powder consists of finely divided silica.

6. A separator according to claim 4 wherein the gel-forming powder consists of cereal flour.

References Cited in the file of this patent

UNITED STATES PATENTS

| | | |
|---|---|---|
| 1,506,217 | Benner et al. | Aug. 26, 1924 |
| 2,302,832 | Behrman | Nov. 24, 1942 |
| 2,655,552 | Fuller et al. | Oct. 13, 1953 |
| 2,712,034 | Seavey et al. | June 28, 1955 |